(12) United States Patent
Gannatal et al.

(10) Patent No.: US 11,221,081 B2
(45) Date of Patent: Jan. 11, 2022

(54) CHECK VALVE

(71) Applicant: PROCO PRODUCTS, INC., Stockton, CA (US)

(72) Inventors: James M. Gannatal, Woodbridge, CA (US); Michael W. Lassas, Ripon, CA (US); Calvin C. Hayes, Sudbury (CA)

(73) Assignee: PROCO PRODUCTS, INC., Stockton, CA (US)

( * ) Notice: Subject to any disclaimer, the term of this patent is extended or adjusted under 35 U.S.C. 154(b) by 234 days.

(21) Appl. No.: 16/398,780

(22) Filed: Apr. 30, 2019

(65) Prior Publication Data

US 2019/0338860 A1 Nov. 7, 2019

Related U.S. Application Data

(60) Provisional application No. 62/666,808, filed on May 4, 2018.

(51) Int. Cl.
*F16K 15/14* (2006.01)

(52) U.S. Cl.
CPC .................................. *F16K 15/147* (2013.01)

(58) Field of Classification Search
CPC ..................................................... F16K 15/147

USPC ......................................................... 137/846
See application file for complete search history.

(56) References Cited

U.S. PATENT DOCUMENTS

| | | | |
|---|---|---|---|
| 4,585,031 A | 4/1986 | Raftis et al. | |
| 4,607,663 A | 8/1986 | Raftis et al. | |
| 5,727,593 A * | 3/1998 | Duer | E03F 7/04 |
| | | | 137/846 |
| 5,931,197 A | 8/1999 | Raftis et al. | |

* cited by examiner

*Primary Examiner* — P. Macade Nichols
(74) *Attorney, Agent, or Firm* — Greer, Burns & Crain, Ltd.

(57) ABSTRACT

An asymmetrical check valve has an inlet end, a transition part and an outlet end, with a pair of vertically orientated lips. The check valve is asymmetric about a horizontal longitudinal plane through a center axis through the inlet end. The upper portion of the transition part increases upwardly, from the inlet end to the outlet end. The lower portion of the transition part increases downwardly, but with less of an increase when compared with the upper portion of the transition part. The inlet end includes a flange or a cuff. The vertically orientated lips may have variable rigidity along their height, and a support may be used to maintain the orientation of the upper portion of the transition part.

13 Claims, 10 Drawing Sheets

CHECK VALVE

RELATED APPLICATIONS

This application claims priority to U.S. Provisional Patent Application No. 62/666,808 filed on May 4, 2018, the entirety of which is incorporated herein by reference.

FIELD OF THE INVENTION

The invention relates to a check valve of the so-called "duckbill" type for use in drainage systems and effluent outfall lines. A typical duckbill check valve has an inlet, an outlet bill, and a transitional middle part for connecting the inlet and the outlet bill.

BACKGROUND OF THE INVENTION

Conventional rubber duckbill check valves may be symmetrical in two planes and attachable to the end of an outlet pipe. See, U.S. Pat. No. 4,607,663. Other duckbill check valves have been designed with horizontally orientated offset lips at the outlet bill. See U.S. Pat. No. 4,585,031. One drawback with this type of design is that water or other fluid may accumulate in the check valve due to the positioning and orientation of the lips at the outlet bill.

Additionally, some rubber duckbill check valves are not able to be utilized in every installation because of spatial problems. The duckbill check valve must have sufficient clearance between the end of the pipe and ground level for proper operation of the outlet bill. If this is not the case, for example, gravel, dirt or sand will accumulate around the lower portion of the outlet bill of the check valve, thereby preventing proper opening of the outlet bill.

U.S. Pat. No. 5,931,197 discloses a rubber duckbill check valve with vertically orientated lips at the outlet bill. The inside lower edge of the lower half of the transition portion of the check valve is at the same level as (aligned with) the inside lower edge of the inlet and the inside lower edge of the outlet bill, while the inside upper edge of the transition portion increases in size, from an axial center line, along a direction from the inlet to the outlet. While the design of the duckbill check valve in U.S. Pat. No. 5,931,197 presumably overcomes the spatial drawbacks associated with some installations, the use of a flat lower transition portion increases the potential for water to accumulate or retention within the pipe and the check valve instead of draining out of the check valve as desired.

It would be desirable to provide a duckbill check valve that is able to be used in installations with spatial clearance issues, and which reduces the accumulation of water or fluid within the check valve.

BRIEF SUMMARY OF THE PRESENT INVENTION

The present invention overcomes one or more drawbacks by providing a check valve with an inlet end, an outlet end, and a transition part connecting the inlet end with the outlet end. The check valve according to the present invention has a pair of vertically extending lips and is asymmetric about a horizontal longitudinal plane through the center of the inlet of the check valve. The inner surface on the upper portion of the transition part has an increasing size (measured from an axis through the center of the inlet of the check valve) along a direction of the axis from the inlet to the outlet, while the inner surface of the lower portion of the transition part also has an increasing size (along the same direction) but with a smaller rate of increase.

With the present check valve, it is thus possible to position the check valve in most any installation such that there is sufficient clearance below the bill of the valve and above ground level. Additionally, due to the orientation of the lips and the increasing size of the lower portion of the transition part, water (or other fluid) is less likely to accumulate within the check valve or associated piping, and instead is drained as desired.

Accordingly, in a first aspect the present invention may be characterized as providing a check valve which includes an inlet end, an outlet end, and, a transition part located between the inlet end and the outlet end. The check valve is asymmetrical about a horizontal longitudinal plane through the check valve, and the horizontal longitudinal plane is coincident with a center axis of the inlet end. The outlet end comprises a pair of vertically orientated lips. A difference between a first distance measured from the center axis to an inner surface of a lower portion of the outlet end and a second distance measured from the center axis to an inner surface of a lower portion of the inlet end is greater than zero.

It is contemplated that the check valve further includes a flange on the inlet end. A third distance, measured from the center axis to an outside bottom of the flange, may be greater than a fourth distance, measured from the center axis to an outside bottom of the outlet end.

It is also contemplated that the check valve further includes a cuff on the inlet end. The cuff may have an inner diameter greater than an inner diameter of the inlet end. A third distance, measured from the center axis to an outside bottom the cuff may be substantially the same size as a fourth distance, measured from the center axis to an outside bottom of the outlet end.

It is further contemplated that the transition part includes a support along an upper portion of the transition part. The support may be integrally formed with the check valve.

It is even further contemplated that the pair of vertically orientated lips have a variable rigidity along their height. An upper portion of the vertically orientated lips may be more rigid compared with a lower portion of the vertically orientated lips.

In another aspect, the present invention may be broadly characterized as providing a check valve that includes an inlet end, an outlet end, and a transition part located between the inlet end and the outlet end. The check valve is asymmetrical about a horizontal longitudinal plane through the check valve, with the horizontal longitudinal plane being coincident with a center axis of the inlet end. The outlet end comprises a pair of vertically orientated lips. The transition part comprises an increasing size along its length, from the inlet end to the outlet end. A distance from the center axis to an inner surface of an upper portion of the transition part increases, in a direction from the inlet end to the outlet end, at a greater rate than a distance from the center axis to an inner surface of a lower portion of the transition part.

It is contemplated that the check valve includes a flange on the inlet end. A third distance, measured from the center axis to an outside bottom of the flange, may be greater than a fourth distance, measured from the center axis to an outside bottom of the outlet end.

It is further contemplated that the check valve includes a cuff on the inlet end, the cuff having an inner diameter greater than an inner diameter of the inlet end. A third distance, measured from the center axis to a bottom of the cuff may be substantially the same size as a fourth distance, measured from the center axis to a bottom of the outlet end.

It is still further contemplated the transition part includes a support along an upper portion of the transition part.

It is also contemplated that the pair of vertically orientated lips have a variable rigidity along their height.

In a third aspect of the present invention, the present invention may be generally characterized as providing a check valve which includes an inlet end, an outlet end, and a transition part located between the inlet end and the outlet end. The check valve is asymmetrical about a horizontal longitudinal plane through the check valve, and the horizontal longitudinal plane is coincident with a center axis of the inlet end. The outlet end comprises a pair of vertically orientated lips. The transition part comprises an increasing size along its length, from the inlet end to the outlet end. A slope of a line along an inner surface of an upper portion of the transition part is greater than an absolute value of a slope of a line along an inner surface of a lower portion of the transition part. The slope of the line along the inner surface of the lower portion of the transition part is not zero.

It is contemplated that the check valve further includes a flange on the inlet end, and a third distance, measured from the center axis to a bottom of the flange, is greater than a fourth distance, measured from the center axis to a bottom of the outlet end.

It is further contemplated that the check valve includes a cuff on the inlet end, and the cuff has a diameter greater than a diameter of the inlet end. A third distance, measured from the center axis to a bottom of the cuff is substantially the same size as a fourth distance, measured from the center axis to a bottom of the outlet end.

It is also contemplated that the pair of vertically orientated lips have a variable rigidity along their height.

These and other aspects and embodiments of the present invention, which may be combinable in any aspect or manner, will be appreciated by those of ordinary skill in the art based upon the following description of the drawings and detailed description of the preferred embodiments.

BRIEF DESCRIPTION OF THE DRAWINGS

The attached drawings will make it possible to understand how the invention may be produced and practiced by those of ordinary skill in the art.

DETAILED DESCRIPTION OF THE PRESENT INVENTION

As mentioned above, a new check valve has been invented. Accordingly, with reference the attached drawings, one or more embodiments of the present invention will now be described with the understanding that the described embodiments are merely preferred and are not intended to be limiting.

With reference to FIGS. 1 to 10, a check valve 10 according to one or more embodiments is shown. The check valve 10 is mounted on an outlet pipe 12 and includes an inlet end 14, outlet end 16, and a transition part 20. The check valve 10 is preferably made from an elastomer, such as neoprene, or elastomer reinforced with synthetic fabric, such as nylon or polyester, with construction similar to an automobile tire. The check valve 10 may be provided with local reinforcements, such as embedded pads of high durometer rubber, high strength synthetic fabric, metal plates, wires, etc. (discussed in more detail below).

In the embodiment shown in FIGS. 1 to 5, the inlet end 14 includes a flange 22 that is secured to a flange 24 on the outlet pipe 12 via a plurality of fasteners 26, such as bolts and nuts.

Alternatively, as shown in the embodiment shown in FIGS. 6 to 10, it is contemplated that the inlet end 14 of the check valve 10 includes a cuff 28 sized to surround the outlet pipe 12. The cuff 28 may include an inner diameter D1 that is larger than an inner diameter D2 of the inlet end 14 of the check valve 10, or it may have the same inner diameter. A C-clamp 30, a clamp band, or another fastener is secured around an outer surface of the cuff 28 or the inlet end 14 of the check valve 10. A pin 32 is inserted into a hole that passes through the C-Clamp 30, the check valve 10, and at least into the outlet pipe 12. The pin 32 maintains the orientation of check valve 10 and prevents the check valve 10 from rotating or being easily removed.

Figure 1:
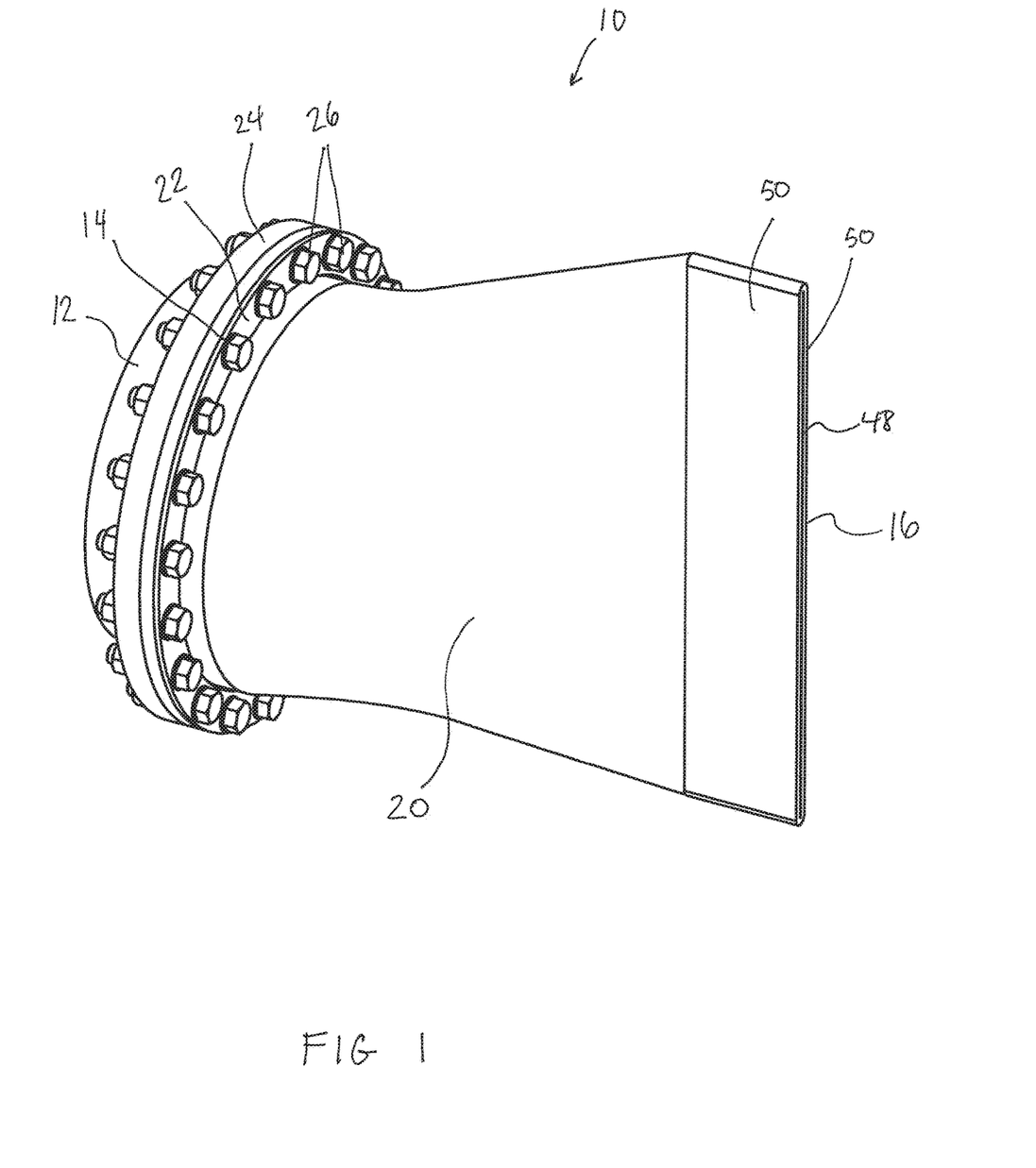
FIG. 1 is a side perspective view of a check valve according to one or more embodiments of the present invention.
Figure 2:
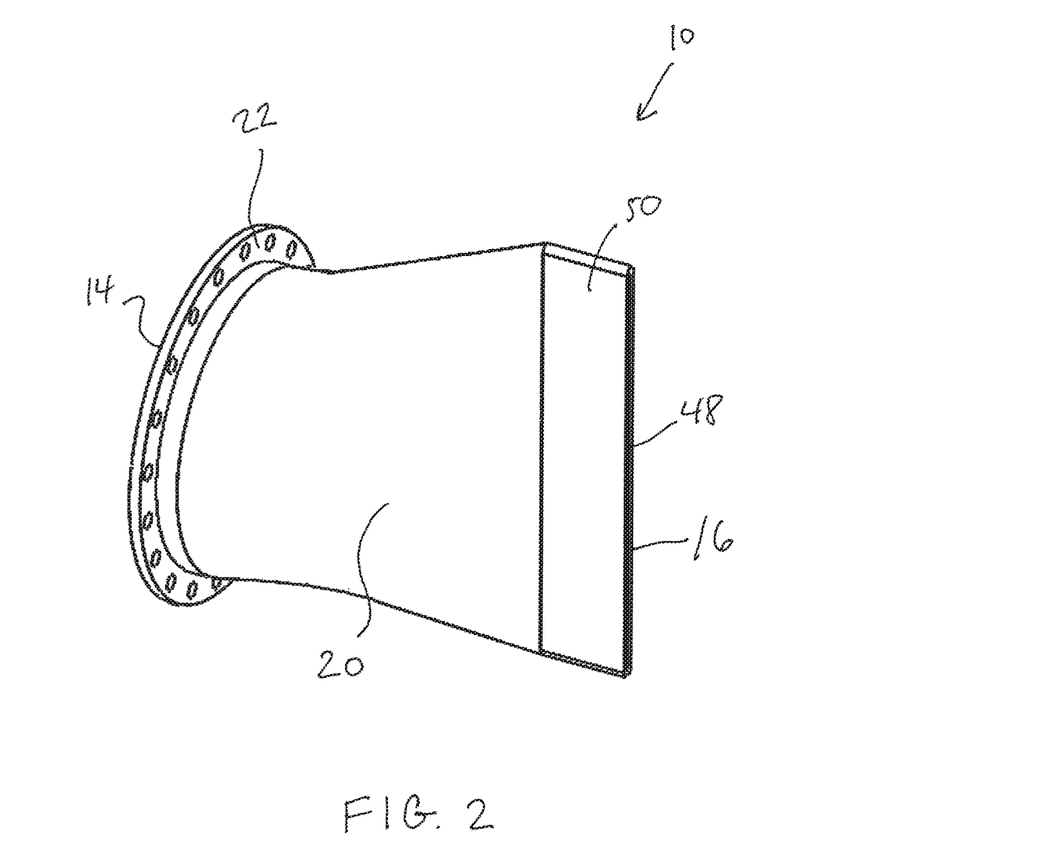
FIG. 2 is another side perspective view of the check valve shown in FIG. 1.
Figure 3:
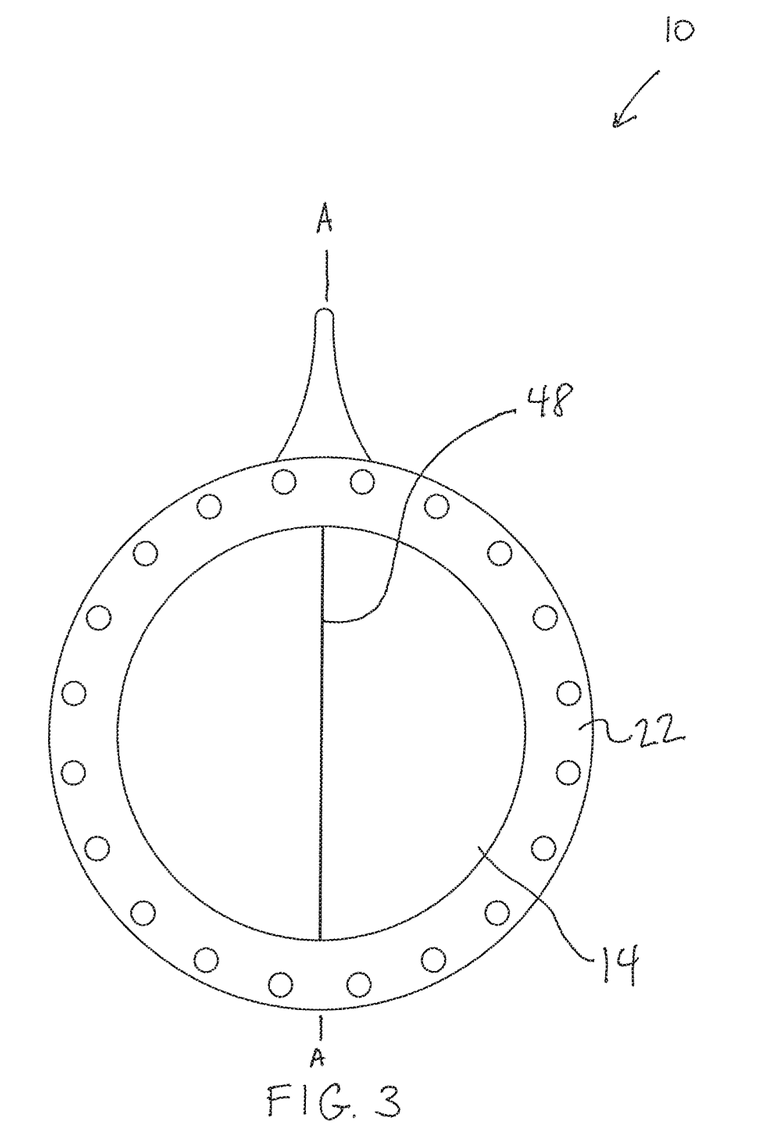
FIG. 3 is a rear elevational view of the check valve shown in FIG. 1.
Figure 4:
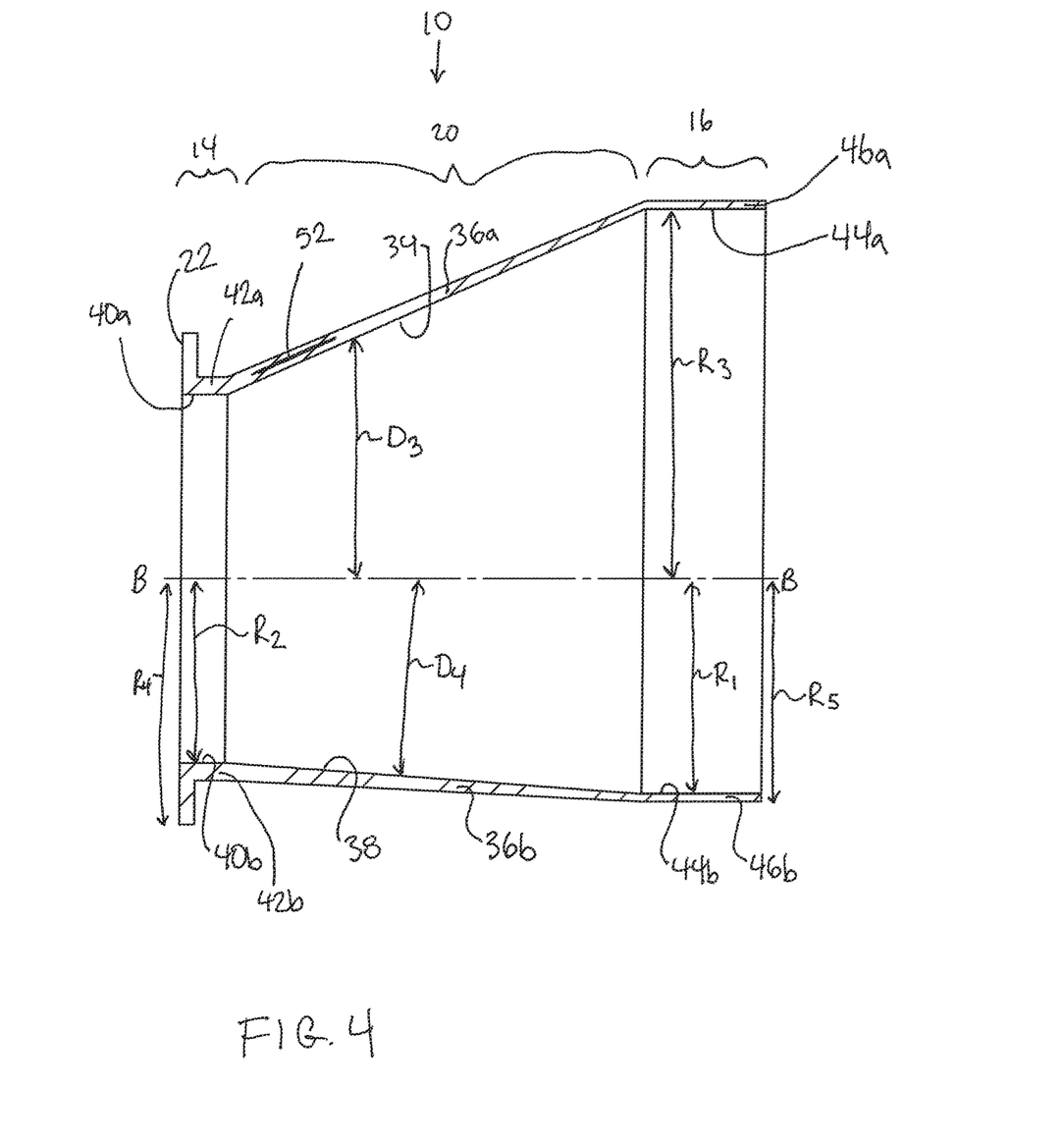
FIG. 4 is a side elevation sectional view of the check valve shown in FIG. 1 taken along line A-A of FIG. 3.
Figure 5:
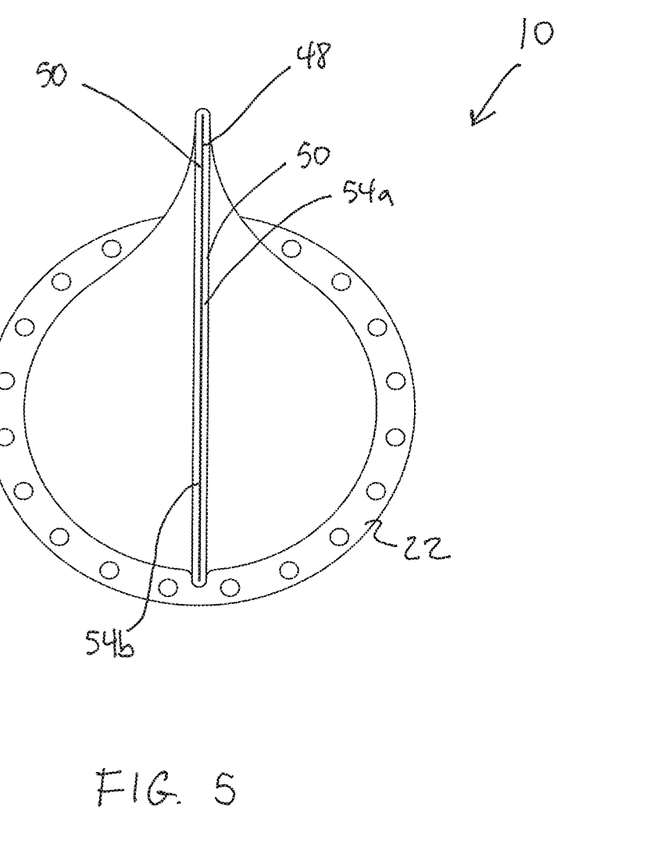
FIG. 5 is a front elevational view of the check valve shown in FIG. 1.
Figure 6:
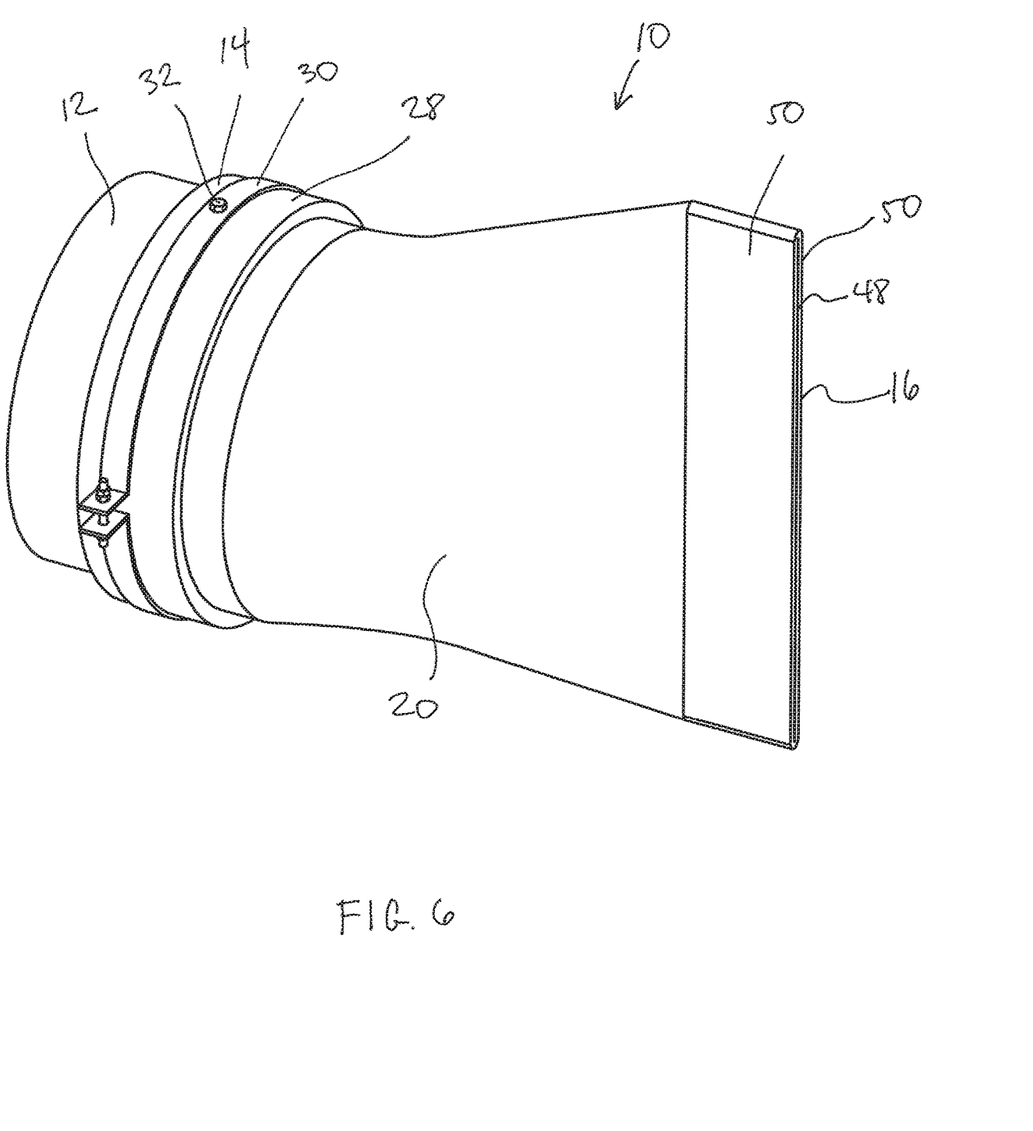
FIG. 6 is a side perspective view of another check valve according to one or more embodiments of the present invention.
Figure 7:
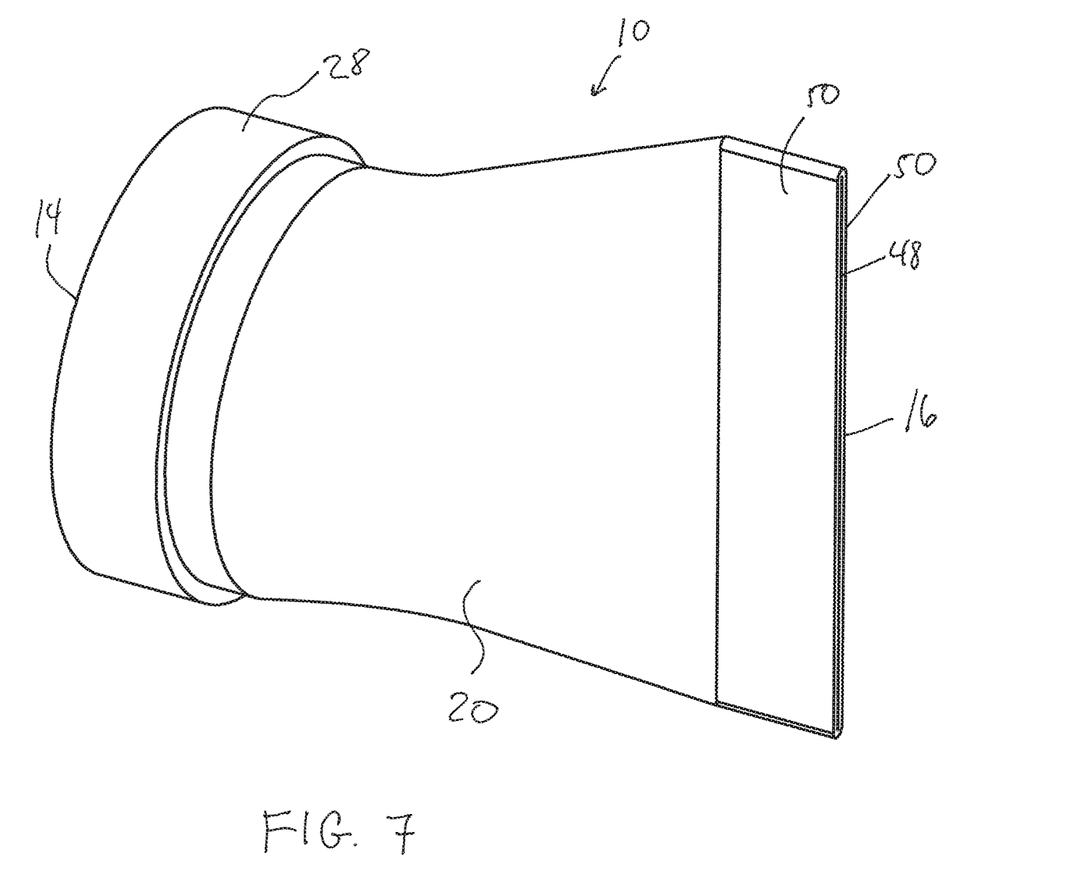
FIG. 7 is another side perspective view of the check valve shown in FIG. 6.
Figure 8:
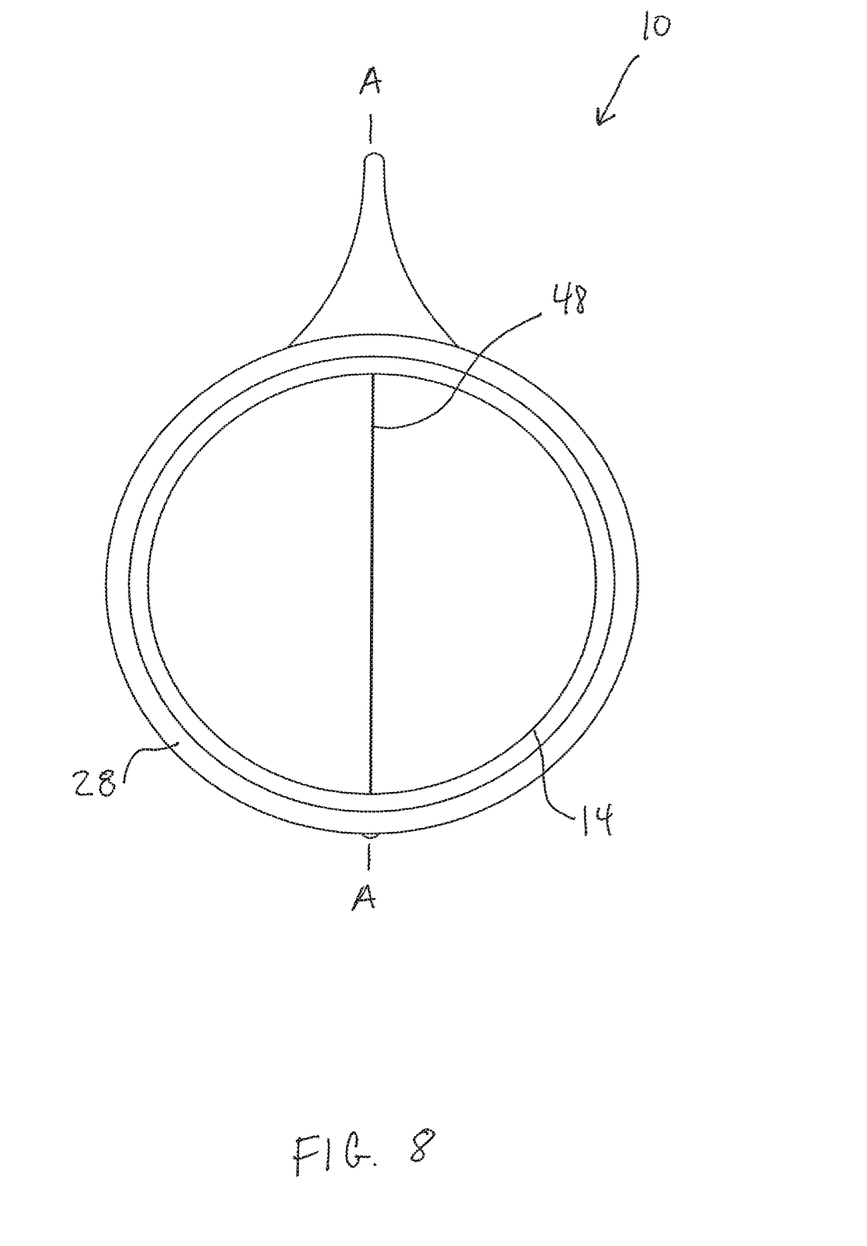
FIG. 8 is a rear elevational view of the check valve shown in FIG. 6.
Figure 9:
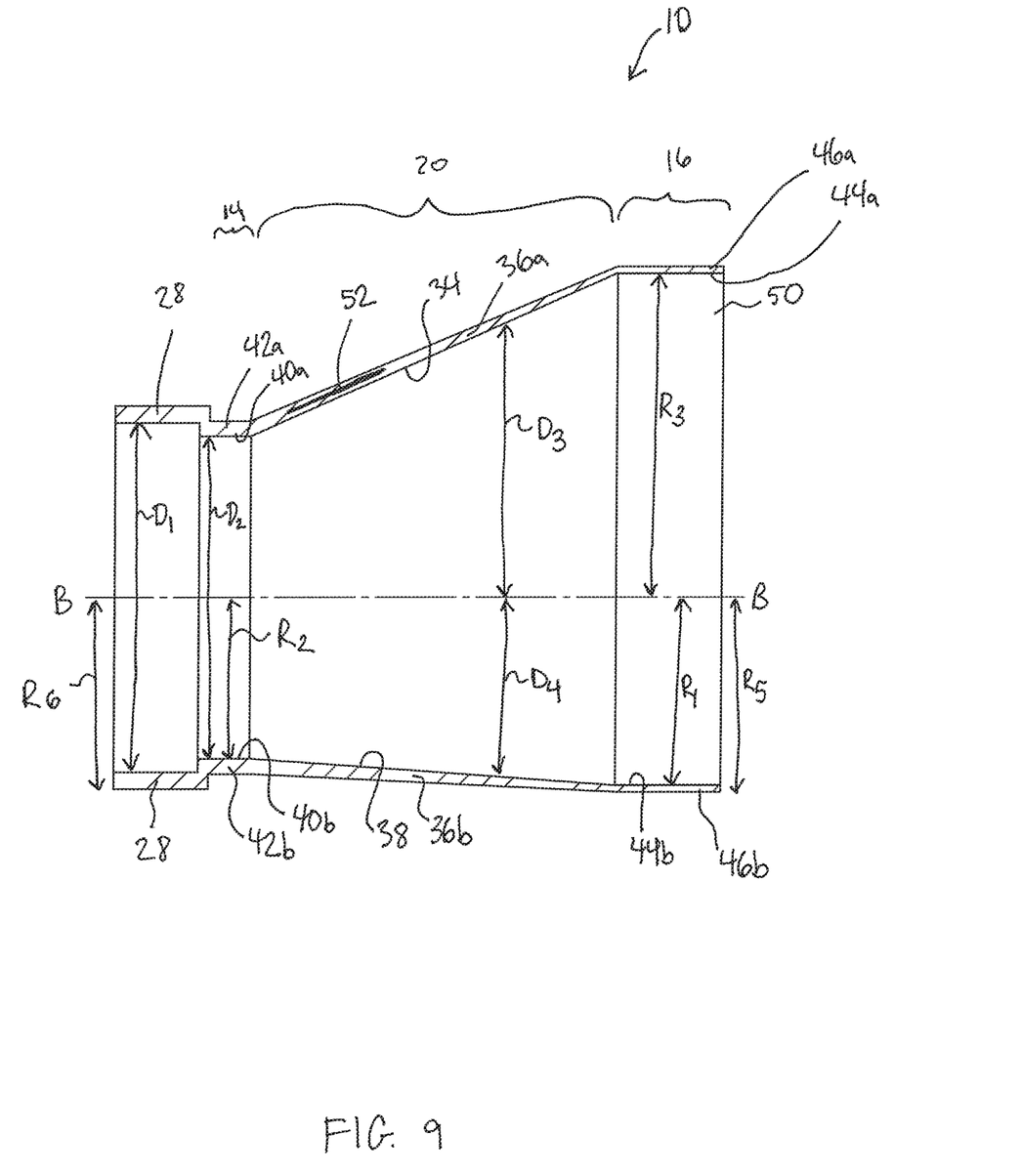
FIG. 9 is a side elevation sectional view of the check valve shown in FIG. 6 taken along line A-A of FIG. 8.
Figure 10:
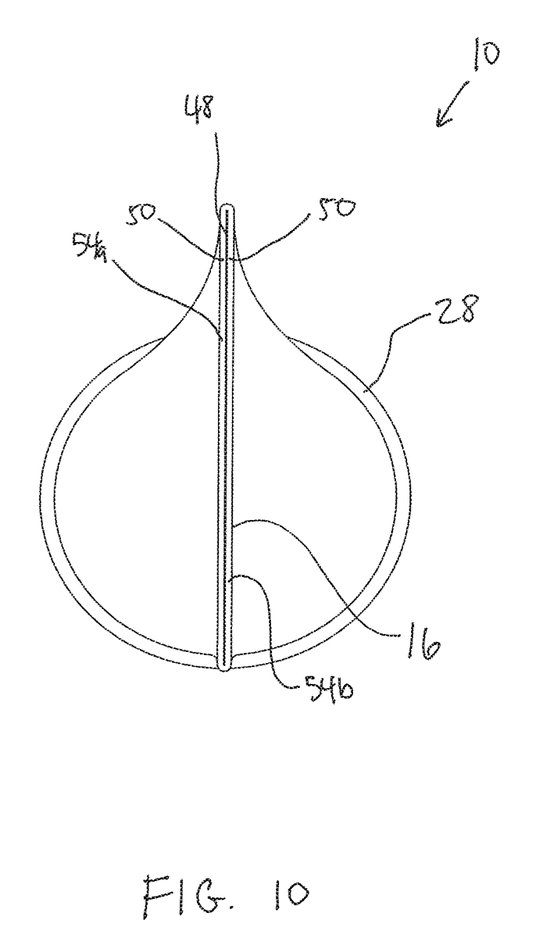
FIG. 10 is a front elevational view of the check valve shown in FIG. 6.

In both embodiments, as shown in FIGS. 4 and 9, an inner surface 34 of an upper portion 36a of the transition part 20 is upwardly inclined in the direction of outflow through the check valve 10 relative to a center axis B-B which is coincident with the center of the inlet end 14 (which is circular) of the check valve 10. Additionally, an inner surface 38 of a lower portion 36b of the transition part 20 is downwardly inclined in the direction of outflow through the check valve 10 relative to the center axis B-B. Preferably, inner surfaces 40a, 40b of upper and lower portions 42a, 42b of the inlet end 14 of the check valve 10 and inner surfaces 44a, 44b of the upper and lower portions 46a, 46b of the outlet end 16 of the check valve 10 are parallel to the center axis B-B along at least a portion of their respective lengths in the direction of outflow through the check valve 10.

Specifically, the transition part 20 increases in size along its length, from the inlet end 14 to the outlet end 16. The distance D3 from the center axis B-B to the inner surface 34 of the upper portion 36a of the transition part 20 increases at a greater rate compared with the rate of increase for the distance D4 from the center axis B-B to the inner surface 38 of the lower portion 36b of the transition part 20. Thus, the slope, or angle, of a line along the inner surface 34 of the upper portion 36a of the transition part 20 is greater than the absolute value of the slope, or angle, of a line along the inner surface 38 of the lower portion 36b of the transition part 20.

Additionally, the slope of the line along the inner surface 38 of the lower portion 36b of the transition part 20 is not zero.

Accordingly, a first distance R1 of the check valve 10, measured from the center axis B-B to the inner surface 44b of the lower portion 46b of the outlet end 16, is greater than a second distance R2, measured from the center axis B-B to the inner surface 40b of the lower portion 42b of the inlet end 14. The difference between the first and second distances R1, R2 is greater than zero. Accordingly, with such an orientation, the check valve 10 is less likely to result in water accumulation since the water inside of the check valve 10 will flow downward along the transition part 20 towards the outlet end 16. Preferably, a third distance R3 of the check valve 10, measured from the center axis B-B to the inner surface 44a of the upper portion 46a of the outlet end 16, is greater than both the first and second distances R1 and R2.

Additionally, the check valve 10 is preferably sized to facilitate utilization in those installations with spatial problems associated with the outlet pipe 12 discussed at the outset.

Accordingly, for the embodiment shown in FIGS. 1 to 5, wherein the check valve 10 includes the flange 22, a fourth distance R4 of the check valve 10, measured from the center axis B-B to the bottom of the flange 24, is greater than a fifth distance R5, measured from the center axis B-B to an outside bottom of the outlet end 16. Similarly, for the embodiment shown in FIGS. 6 to 10, a sixth distance R6 of the check valve 10, measured from the center axis B-B to an outside bottom of the cuff 28 is substantially the same size as the fifth distance R5 (the center axis B-B to the bottom of the outlet end 16). Again, with such a configuration, the check valve 10 is able to be utilized in installations where the clearance at the outlet pipe 12 is at (or nearly at) ground level.

The outlet end 16 of the check valve 10 has a slit 48 formed between two vertically orientated lips 50. The present check valve 10 is asymmetrical about a horizontal plane coincident with the center axis B-B, but symmetrical about a corresponding vertical plane. In other words, a greater portion of each of the lips 50 is above the center axis B-B than is below the center axis B-B.

As shown in FIGS. 4 and 9, it is contemplated that the check valve 10 may include a support 52 in the upper portion 36a of the transition part 20. The support 52 prevents the check valve 10 from drooping under the weight of the fluid which passes through the check valve 10. Without the support 52, the lips 50 of the outlet end 16 could, under stress, become fixed in a drooped position, thus preventing the check valve 10 from returning to a fully closed position.

The support 52 may be integral with the material of the check valve 10, or the support may be a discrete component applied to an inner or outer surface of the check valve 10. Any suitable material is contemplated for the support 52, including metals, such as steel (e.g., spring steel or plain metal) or another suitable material. The support 52 could also be a result of the material used to form the check valve 10, including the thickness of the appropriate portion, or an increase in reinforced fibers or cording included in the check valve 10.

It is also contemplated that the lips 50 may have a variable rigidity along their heights, preferably with an upper portion 54a of the lips 50 being more rigid than a lower portion 54b of the lips. For example, the upper portion 54a of the lips 50 may include more reinforced materials (fibers, cording, etc.) or may be a different thickness than the lower portion 54b of the lips 50. Providing the lower portion 54b of the lips 50 with less rigidity, is believed to further decrease the likelihood that water or fluid will accumulate or be retained within the check valve 10 or the outlet pipe 12.

Thus, the present check valve 10 may be used in installations where the clearance at the outlet pipe is near ground level and also reduce the opportunity for water or other fluids to accumulate within the check valve instead of draining.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A check valve, comprising:
   an inlet end and an outlet end;
   a transition part located between the inlet end and the outlet end; and,
   the check valve being asymmetrical about a horizontal longitudinal plane through the check valve, the horizontal longitudinal plane being coincident with a center axis of the inlet end;
   wherein the outlet end comprises a pair of vertically orientated lips;
   wherein a difference between a first distance measured from the center axis to an inner surface of a lower portion of the outlet end and a second distance measured from the center axis to an inner surface of a lower portion of the inlet end is greater than zero;
   wherein the pair of vertically oriented lips have a variable rigidity along their height; and
   wherein an upper portion of the vertically oriented lips is more rigid compared with a lower portion of the vertically oriented lips.

2. The check valve of claim 1 further comprising a cuff on the inlet end, the cuff having an inner diameter greater than an inner diameter of the inlet end.

3. The check valve of claim 2 wherein a third distance, measured from the center axis to an outside bottom the cuff is substantially the same size as a fourth distance, measured from the center axis to an outside bottom of the outlet end.

4. The check valve of claim 1 wherein the transition part includes a support along an upper portion of the transition part.

5. The check valve of claim 4, wherein the support is integrally formed with the check valve.

6. A check valve, comprising:
   an inlet end and an outlet end;
   a transition part located between the inlet end and the outlet end; and,
   the check valve being asymmetrical about a horizontal longitudinal plane through the check valve, the horizontal longitudinal plane being coincident with a center axis of the inlet end, and,
   wherein the outlet end comprises a pair of vertically orientated lips, and,
   wherein the transition part comprises an increasing size along its length, from the inlet end to the outlet end, and,
   wherein a first distance from the center axis to an inner surface of an upper portion of the transition part increases, in a direction from the inlet end to the outlet end, at a greater rate than a second distance from the center axis to an inner surface of a lower portion of the transition part.

7. The check valve of claim 6 further comprising a cuff on the inlet end, the cuff having an inner diameter greater than an inner diameter of the inlet end.

8. The check valve of claim 7 wherein a third distance, measured from the center axis to a bottom of the cuff is substantially the same size as a fourth distance, measured from the center axis to a bottom of the outlet end.

9. The check valve of claim 6 wherein the transition part includes a support along an upper portion of the transition part.

10. The check valve of claim 6 wherein the pair of vertically orientated lips have a variable rigidity along their height.

11. A check valve, comprising:
an inlet end and an outlet end;
a transition part located between the inlet end and the outlet end; and,
the check valve being asymmetrical about a horizontal longitudinal plane through the check valve, the horizontal longitudinal plane being coincident with a center axis of the inlet end, and,
wherein the outlet end comprises a pair of vertically orientated lips, and,
wherein the transition part comprises an increasing size along its length, from the inlet end to the outlet end, and,
wherein a slope of a line along an inner surface of an upper portion of the transition part is greater than an absolute value of a slope of a line along an inner surface of a lower portion of the transition part, and,
wherein the slope of the line along the inner surface of the lower portion of the transition part is not zero.

12. The check valve of claim 11 further comprising a cuff on the inlet end, the cuff having a diameter greater than a diameter of the inlet end, and
wherein a third distance, measured from the center axis to a bottom of the cuff is substantially the same size as a fourth distance, measured from the center axis to a bottom of the outlet end.

13. The check valve of claim 11 wherein the pair of vertically orientated lips have a variable rigidity along their height.

* * * * *